United States Patent [19]
Vishlitzky et al.

[11] Patent Number: 5,513,336
[45] Date of Patent: Apr. 30, 1996

[54] SYSTEM AND METHOD FOR DETERMINING WHEN AND WHAT POSITION IN CACHE MEMORY TO STORE DATA ELEMENTS UTILIZING LEAST AND LAST ACCESSED DATA REPLACEMENT METHOD

[75] Inventors: Natan Vishlitzky; Haim Kopylovitz, both of Brookline, Mass.

[73] Assignee: EMC Corporation, Hopkinton, Mass.

[21] Appl. No.: 354,479

[22] Filed: Dec. 12, 1994

Related U.S. Application Data

[63] Continuation-in-part of Ser. No. 893,509, Jun. 4, 1992, Pat. No. 5,381,539.
[51] Int. Cl.$^6$ .................................................. G06F 12/12
[52] U.S. Cl. .................... 395/463; 395/440; 364/DIG. 1; 364/243.41; 364/246.12
[58] Field of Search .............................. 364/200 MS File, 364/900 MS File; 395/403, 440, 460, 461, 463

[56] References Cited

U.S. PATENT DOCUMENTS

| | | | |
|---|---|---|---|
| 4,607,331 | 8/1986 | Goodrich, Jr. et al. | 395/463 |
| 5,140,690 | 8/1992 | Hata et al. | 395/463 |
| 5,283,884 | 2/1994 | Menon et al. | 395/440 |

*Primary Examiner*—Matthew M. Kim
*Attorney, Agent, or Firm*—Daniel J. Bourque; Kevin J. Carroll; David D. Lowry

[57] ABSTRACT

A cache management system and method monitors and controls the contents of cache memory. Cache memory is organized into at least a first section for storing data waiting to be written to a longer term data storage device, and a second section for storing data elements which have been written to the longer term data storage device. A time indication provider provides a time indication signal to a cache indexer, for maintaining a cache index representing data elements which are stored in cache as well as an indication that a data element must be written to a longer term data storage device. A cache manager is responsible for placing data elements into and removing data elements from the cache memory. The cache manager determimes the amount of time that the data element has been stored in cache as well as the average period of time that elapses between a data element being inserted in cache and being removed from cache. Based on a comparison of the average period of time a data element spends in cache, and the amount of time a data element spends in cache, and the amount of time that the element has been stored in cache, the cache manager determines whether to place the data element in the top of the cache, to allow the data element to remain in cache a longer period of time, or at the bottom of the cache which will cause the data element to be removed from cache more quickly.

33 Claims, 8 Drawing Sheets

SYSTEM AND METHOD FOR DETERMINING WHEN AND WHAT POSITION IN CACHE MEMORY TO STORE DATA ELEMENTS UTILIZING LEAST AND LAST ACCESSED DATA REPLACEMENT METHOD

RELATED APPLICATIONS

This Application is a continuation-in-part of U.S. patent application Ser. No. 07/893,509, filed Jun. 4, 1992, now U.S. Pat. No. 5,381,539 issued on Jan. 10, 1995, by the same inventors as herein, assigned to the same assignee as the present invention, and fully incorporated herein by reference.

FIELD OF THE INVENTION

This invention relates to data processing systems and more particularly, to a system and method for managing data within temporary, relatively high speed memory prior to writing to a longer term storage media.

BACKGROUND OF THE INVENTION

Data processing systems such as data storage systems which are coupled to a large amount of data storage may spend a great deal of CPU and I/O BUS time reading and writing data to and from the data storage devices. Reading from and writing data to and from disk drives or similar long term data storage devices tremendously impacts and decreases performance and throughput of the data processing systems.

Accordingly, many data storage systems now include high speed, short term cache memory which can be accessed rapidly by a coupled computer system commonly referred to as a host system without the delays associated with the mechanical motion and time delay inherent in a long term storage device such as a disk drive.

Thus, if data requested by a host is stored in cache instead of on the disk drive, system performance can be increased tremendously. Cache memory, however, is a finite resource. It is costly and accordingly, must be properly managed to yield its intended benefit.

Prior art systems or methods aimed at managing cache memory include a system disclosed in U.S. Pat. No. 4,489,378 wherein the system prefetches a selected number of records in anticipation that the data will soon be requested. Several problems, however, exist with such a system. For example, the system has no knowledge of what is already stored in cache and thus, the system must make real time decisions as to whether or not a sequential data access is being performed.

Further, the system prefetches a selected number of data elements without regard for what is currently in cache. Most importantly, such a system is not efficient when used with a multi-tasking/multi-processor system wherein a storage device controller is handling requests in a multiplexed fashion from many hosts. In such a case, multiplexed sequential data access would appear as a non-sequential or random data requests to the cache manager and the desired data would not be present in the cache due to the non-sequential appearance of the task.

An additional prior art system for controlling or managing cache memory is disclosed in U.S. Pat. No. 4,853,846 wherein a cache memory directory is split up into as many segments as there are processors or hosts which are accessing the memory. Given the associated high cost of cache memory, such a system results in expensive, duplicative cache memories. In addition, such a system is also incapable of handling multi-tasking systems given that the system requires a dedicated cache directory associated with each accessing host or processor.

Further, both referenced prior art systems as well as other similar prior art systems are not capable of allowing the user to establish selectable thresholds or criteria to determine the threshold for determining that a sequential task is indeed in progress, the number of data records to prefetch once a sequential task has been identified, and the amount of cache memory to be allocated to a given task.

Cache memory is also utilized when data is being written from a host computer to a long term data storage device such as a disk drive. In such systems, data may be written to short term, high speed, cache memory in which it is temporarily held with an indication that this data must be written to longer term data storage when the data storage system finds it convenient or otherwise has the time to perform this operation. When utilizing short term, high speed memory, such as cache, to temporarily hold write pending data, memory storage locations are removed from the main pool of memory storage locations generally available to the data storage system in which data may be held pending use by the host.

Accordingly, when data which is "write pending" has been written to a longer term storage media, the memory locations containing the now written data must be returned to the main memory pool as quickly as possible in order to ensure that enough memory remains available for data which is being transferred from the longer term data storage device, such as a disk drive, to the memory, awaiting retrieval by a host system.

Further, due to the random usage of cache memory, cache memory addresses containing data which have recently been written to longer term storage media must be returned to the main memory pool in such a manner as to ensure that if the data which has recently been written to longer term storage media will not be utilized, those cache memory locations should be made available as quickly as possible to the main cache pool. If, however, it is possible that the data having just previously been written to longer term storage media may be utilized by the host, then this data should be retained in memory for a period of time sufficient to ensure its accessibility to the host.

Prior cache management or data processing systems, however, have not utilized methods to control usability of short term, cache memory which contains data to be written or which has recently been written, to longer term data storage media. An additional difficulty exists in those systems which attempt to anticipate data requests by identifying sequential data access "jobs" by looking only for a predetermined number of sequential tracks in cache memory using only the virtual address of the track. Even a pure random data access will cause the data storage system to access data with adjacent addresses in a random manner over a long period of time, thus making the cache management system falsely believe that a sequential data access is in progress when in fact there is not. This false indication that a sequential data access is in progress will cause the cache management system to prefetch additional unnecessary data into the cache which will not be utilized but merely take up valuable and finite cache memory space.

Accordingly, what is needed is a system and method for managing short term memory storage locations which contain data to be written to long term data storage media in such a way as to ensure that the memory addresses are made available to a main memory pool as quickly as possible, without sacrificing or overwriting data which resides in high speed, shorter term memory which may be utilized by a coupled host computer in a relatively short period of time.

SUMMARY OF THE INVENTION

A cache management system and method is disclosed which allows a single cache memory to be utilized in a multi-tasking or multi-processor environment without the need for creating multiple cache directories. Additionally, the cache management system and method allows the user to establish selectable thresholds and criteria for each and every physical or logical storage device coupled to the data processing system, thus allowing the criteria to be selected on a process-by-process basis.

The present cache management system and method monitors and controls addresses of short term cache memory in which are stored data elements awaiting writing to a longer term data storage device such as a disk drive. Once the data elements have been actually written to the data storage device, the present cache management system and method utilizes an indication of the amount of time the data element was in cache as well as an indication of the number of times a data element was accessed in order to determine how long to maintain the data record which has now been previously written to a data storage device in the short term cache memory.

The present cache management system and method also takes into account the length of time that a data element has been in cache or the actual time of data access in relationship to a physically adjacent data element in order to make a determination as to whether or not a sequential data access is in progress by any given process on a multi-processor multi-tasking system.

The present cache management system and method provides for monitoring and controlling the contents of cache memory which is coupled to at least one data storage device. A time indicator outputs a signal including a time indication. The time indication may be in real time or in relative time. A cache indexer maintains a cache index of data elements which are stored in cache pending or awaiting being written to the at least one longer term data storage device and responsive to the time indicator, stores at least one time indication along with each respective data element index maintained in the cache index.

A sequential data access indicator is responsive to the cache index, to a selectable sequential data access threshold provided by the user, and to a comparison of time indication associated with at least first and second sequential data elements, for determining that a number of sequential data elements have been requested which exceeds the sequential data threshold within a predetermined period of time, thus indicating that at least one occurrence of a sequential data access is in progress by a given one process executing on the host, and for providing an indication of that determination.

In response to the indication of a sequential data access in progress provided by the sequential data access indicator, a micro-cache memory is established in the main cache memory for each and every process having a sequential data access in progress. Subsequently, a data retrieval requestor requests retrieval or prefetching from a data storage device coupled to the system, of up to a user selectable predetermined number of data elements to be prefetched.

In one embodiment, the cache management system further includes a cache data replacer, which is responsive to a user supplied selectable predetermined maximum number of sequential data elements which are to be stored in the cache memory for a given process, for replacing or over-writing the least recently used sequential data elements in excess of the predetermined maximum number of elements established by the process parameters set up by the user.

The presently described cache management system also includes a method for monitoring and controlling the contents of cache memory coupled to at least one data storage device. The method includes establishing and maintaining a cache directory including at least an indication of which data elements are currently in the cache memory and which data elements must be written to longer term data storage along with a time indication with each indexed data element indicating what time the data element was placed in cache. User selectable criteria are established including a sequential data access threshold, for providing a predetermined minimum number of data elements stored in the cache memory indicating the occurrence of a sequential data access in progress by at least one host system if the sequential data elements occur with a predetermined period of time.

When the data storage system determines that there is sufficient time to perform various data handling routines, such as writing data from cache to a longer term data storage device, the cache management system of the present invention examines the cache index to determine which data elements must be written to a longer term data storage device by examining whether or not a particular data element includes a write pending indication. Upon discovering data elements with a write pending indication, the cache management system of the present invention causes the data element to be written from cache to the longer term data storage device. The cache management system next determines the period of time that the data element remains in cache, awaiting being written to disk. During the period of time that a data element is in the cache awaiting writing to a longer term data storage device, the data element is stored in a first section of cache memory.

After writing the data element to the longer term data storage device and determining the period of time the data element resided in the first section of the cache memory, the cache management system of the present invention next determines the average elapsed period of time that one or more data elements have spent in a second cache memory section, awaiting final removal from the cache memory entirely. A second section of cache memory is allocated to those data elements which have been written to a longer term data storage device but which, due to the short amount of time they have spent in cache, are maintained in cache memory in the event that a host system may call upon the data again.

According to the method of the present invention, the cache management system next compares the amount of time that a data element, just written to a longer term storage device, has spent in the first section of the cache memory with an average elapsed period of time that a data element spends in the second section of the cache memory, before being discarded. If the period of time which the data element has spent in the first cache memory section is less than the average elapsed period of time that a data element spends in the second cache memory section, then it is likely that the data element may be called upon by a host and accordingly, the data element will be placed in a top most position in the second section of the cache memory, as a last recently used data element. Over time, the last recently used data element will migrate from the "top" to the "bottom" of the second cache memory section and will be discarded in accordance with a least recently used (LRU) algorithm operating in the cache memory system.

If, however, the cache management system determines that the period of time that the data element spent in the first cache memory section is greater than the average elapsed period of time that a data element spends in the second cache memory section, then it is unlikely that a host will access or read the data element and accordingly, the present cache management system and method will place the data element in the hypothetical "bottom" of the second cache memory section as a least recently used data element. Subsequently, the least recently used cache management algorithm operating in the cache management system will discard this data element very quickly and return its cache memory location(s) to the main cache memory pool for use by various processes executing on the data storage system.

The present system and method also scans or monitors the cache directory, and in response to the user selected sequential data access threshold and a time indication comparison between at least first and second detected sequential data elements stored in cache, the method determines that a sequential data access is in progress. In response to a user selectable predetermined number of data elements to be retrieved or prefetched from a data storage device, and to the determination of a sequential data access in progress, the established user selectable predetermined number of data elements are retrieved in response to a retrieval request.

In response to a user selectable predetermined maximum number of sequential data elements to be stored in cache memory, the method sequentially replaces in the cache data elements which exceed the predetermined maximum number established by the process parameters.

An additional feature of the presently disclosed cache manager is a dynamic monitoring and adjustment feature which provides the cache manager with the ability to monitor and dynamically alter several cache manager parameters for each process having a sequential data access in progress and thus, to monitor the effectiveness of the cache management algorithm controlling each and every sequential process, in an attempt to improve on the algorithms.

The dynamic monitoring and adjustment feature of the cache manager continuously monitors the cache index/directory once a sequential process has been detected, to determine whether the tracks or data records which have been prefetched have in fact been used by the host system. The dynamic monitoring and adjustment feature of the present cache manager will accordingly increase the sequential access detection threshold when unused tracks or records are detected, and decrease the detection threshold in response to a large number or long continuous string of used data records or tracks, thus allowing the sequential detection threshold to "float" at the optimum level for each process.

The dynamic monitoring and adjustment feature of the present cache manager also monitors and dynamically adjusts the number of data tracks or records to be prefetched as a function of the number of sequential data tracks or records which have been used.

Thus, a large or lengthy sequential process will result in a higher number of prefetched data tracks or records whereas a shorter or smaller sequential process will result in fewer data tracks or records prefetched. Further, as a result of increasing the number of data tracks or records to prefetch, the dynamic monitoring and adjustment feature of the present cache manager will allow the size of the micro-cache memory "loops" for a given process to increase and decrease in size with a corresponding increase or decrease fluctuation in the number of data tracks or records to prefetch for that process.

DESCRIPTION OF THE DRAWINGS

These and other features and advantages of the present invention will be better understood by reading the following detailed description, taken together with the drawings wherein.

DETAILED DESCRIPTION OF THE INVENTION

Figure 1:
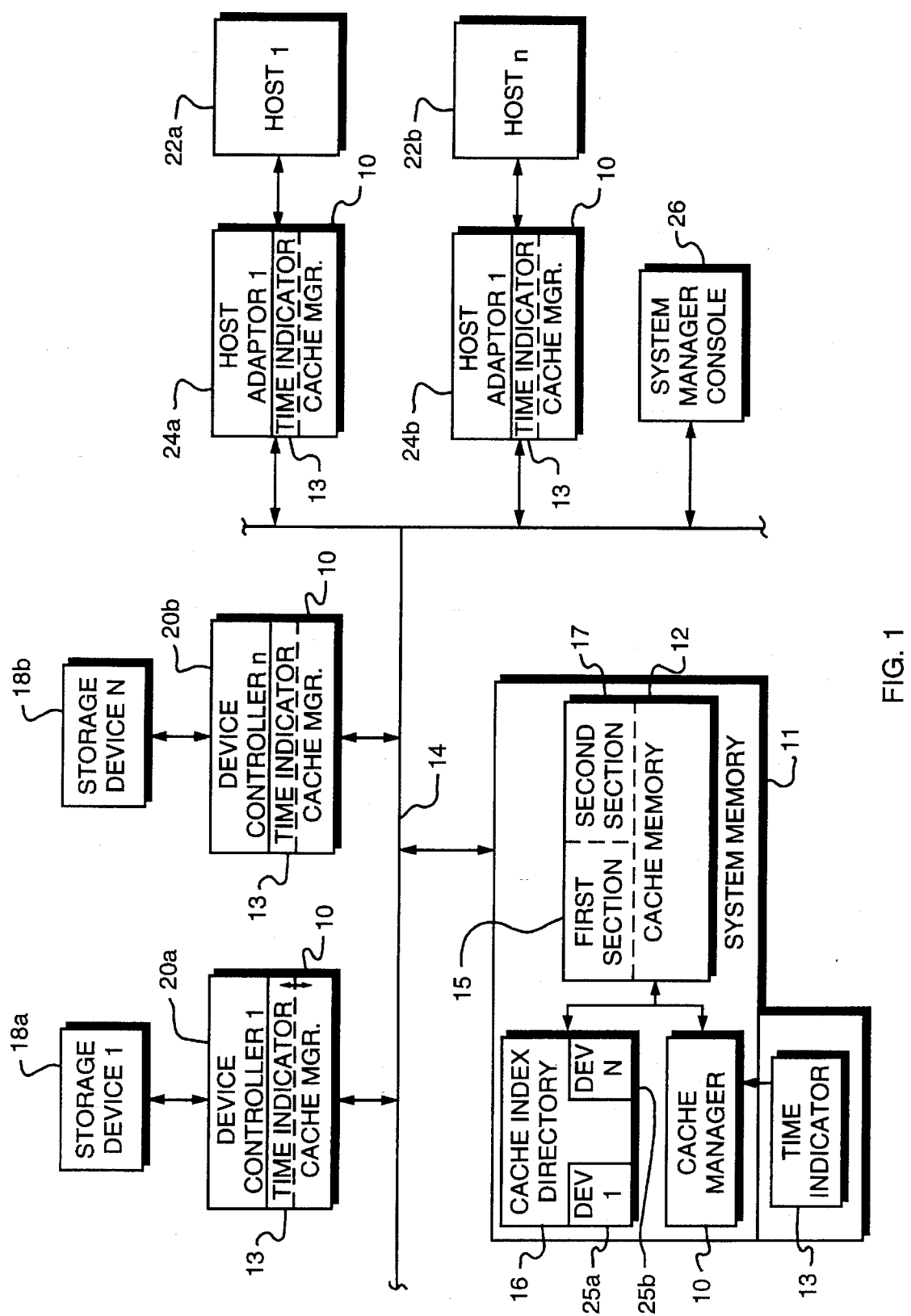
FIG. 1 is a block diagram of the cache management system of the present invention.

The cache management system for monitoring and controlling the contents of cache memory such as in a data storage system is shown in block diagram form in FIG. 1 is implemented using a cache manager 10. An example of a data storage system capable of carrying out the present invention is a Symmetrix Model 5XXX data storage system available from EMC Corporation, Hopkinton, Mass. Cache manager 10 is preferably a virtual entity and can be resident in any location including system memory 11, device controllers 20a–20b and host adapters 24a–24b. Additionally, the functionality of cache manager 10 may distributed over one or more of such locations to better manager the cache memory locations 12 being maintained and utilized for that particular data storage device, in order to optimize system performance. Device controllers 20 and host adapters are well known in the art and include data director boards available from EMC Corporation, Hopkinton, Mass.

Cache manager 10 receives as input, a time indication value from time indicator 13 which is typically and preferably a battery backed-up real time clock chip located on the device controller 20 or host adapter 24 which is implementing the cache manager function.

In the preferred embodiment, each controller 20 and host adapter 24 includes its own clock or time signal generator. Although each clock is unsynchronized, each controller 20 and host adapter 24 places its time clock value in system memory 11. Each controller/host adapter can thus determine if all other controllers are functioning or "alive" by monitoring the time clock value. The cache manager chooses one of the time clock values as the "system" clock value and will always reference events to that value, thus eliminating the need to "synchronize"0 the many time signal generations or clocks.

Other time indication signals including a relative time signal, for example, are also considered to be within the scope of this invention.

Cache memory 12 is typically organized as one main pool of cache memory locations. In the preferred embodiment of the present invention, the cache memory is divided into at least first and second sections 15, 17, respectively. The first cache memory section is utilized to store data elements which need to be written to a longer term data storage device such as a disk drive.

An indication that the data elements need to be written to a longer term data storage device is maintained in the cache index directory 16 as will be more fully explained below.

The second section 17 of cache memory 12 is used to provide memory storage locations for those data elements which have been written to a longer term data storage device but which, due to the amount of time that they have resided in cache memory, the present cache management system has determined should remain in cache to ensure that the data element is available in the event that a host system wishes to again access the data element.

For example, it has been empirically established that if a data element resides in cache more than two seconds without being used by a host, chances are that the data will not be accessed again within a reasonable period of time that would warrant maintaining the data element in cache memory. Since cache memory is a valuable and expensive resource, it is more desirable to remove that data element from cache memory, and return the cache memory address(es) (slots) for use by the main cache memory pool. One process of determining how long to maintain a selected data element in the second section 17 of cache memory will be explained in greater detail below.

An exemplary data storage system for use with the present cache manager typically includes one or more devices such as host/channel adapter boards 24a–24n which are adapted to receive data read/write commands and associated data over one or more communication channels from one or more hosts 22a–22n (not part of the present invention).

The host/channel adapter boards 24a–24n are coupled to cache memory 12 by means of bus 14. Bus 14 is also coupled to one or more data storage device controller/adapter boards 20a–20n which serve to control the reading and writing of data to or from respective longer term data storage devices 18a–18b. Exemplary controller and host adapter boards are described in Applicants' U.S. Pat. No. 5,335,352 entitled Reconfigurable, Multi-Function Disk Controller, which is incorporated herein by reference.

In one embodiment, longer term data storage devices 18a–18b include disk storage devices, each of which may include one or more disk drives, dependent upon the user's requirements and system configuration. Additional embodiments also contemplate various data storage devices including, but not limited to, optical disks, CD ROMS and magnetic tape devices.

In order to improve data processing system performance, a data processing system such as a data storage system incorporating the present cache manager does not wait for device controllers 20a–20n to read or write data directly to or from the appropriate data storage device(s) and the host but rather, data to be written to or read from the data storage device(s) to the host is routed through and stored in cache memory 12. The present cache manager is directed to both data storage device read requests by a host system, and write requests from the host to the longer term data storage device. In the preferred embodiment, cache memory 12 includes high speed semiconductor memory whose data is rapidly accessible to both the device controllers 20 and the host adapters 24.

The preferred embodiment of the present invention also includes an index/directory 16 which serves to provide at least an indication of the data which is stored in the cache memory and provide the address or pointer to the data in cache. The index/directory 16 may also serve other functions including containing the address of data on the data storage device, and data which must be written to disk, and may also include other flag or status bits.

Figure 2:
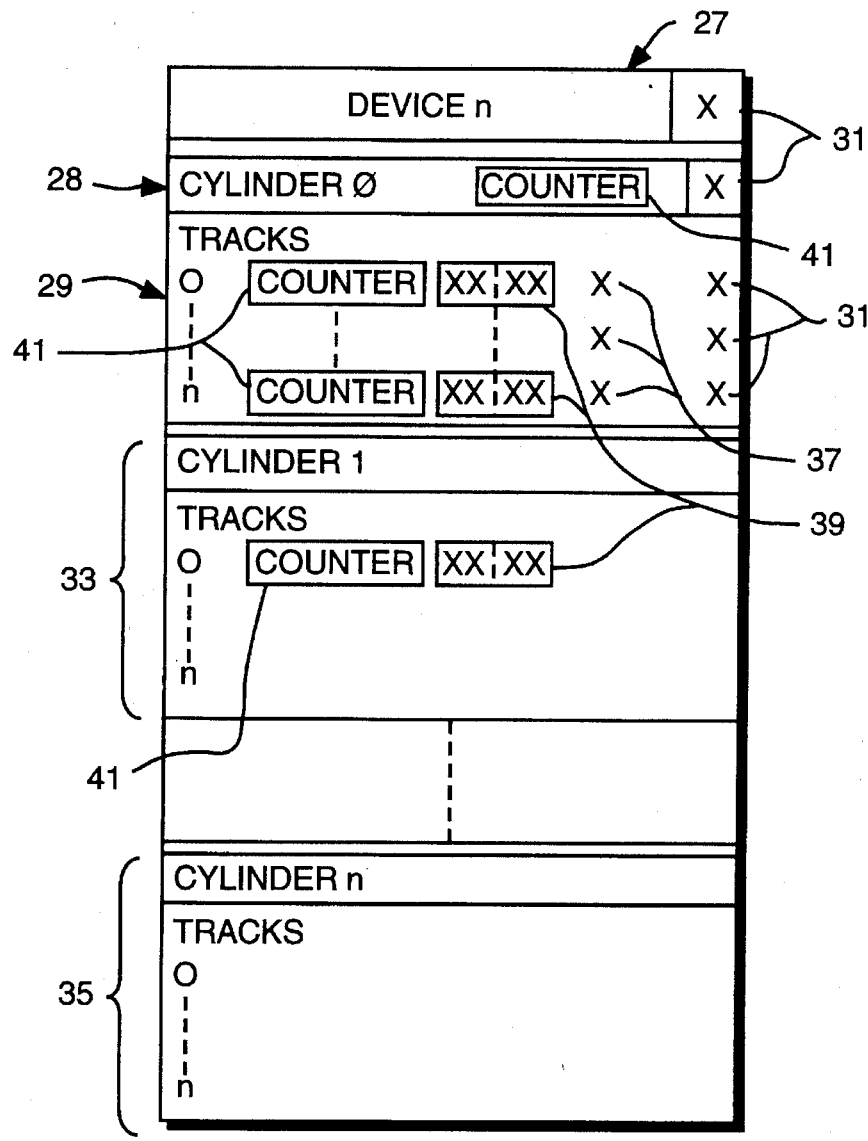
FIG. 2 is a representation of a data storage device cache index/directory table.

The cache index/directory 16 is comprised of one or more device tables 25a and 25b more particularly shown in FIG. 2 below. In the preferred embodiment, the contents of the cache index/directory 16 is maintained current by cache manager 10 and is located in the system memory 11. An example of a data storage system capable of utilizing the present invention is the Symmetrix 5XXXX Series data storage systems available from EMC Corporation, Hopkinton, Mass.

The cache index/directory 16 is preferably organized on a storage device by storage device basis with one "table" 25, for each data storage device. Each data storage device table is further organized by device storage elements. For example, for a given longer term data storage device such as a disk drive, a device table 25 includes a device table entry or header 27, which uniquely identified the long term data storage followed by cylinder 0 table entry 28 which identified a first cylinder, followed by cylinder 0 track information 29. In the preferred embodiment, the track information includes cache address, time written in cache indications, number of times accessed indications, write pending flag bits and other various flag bits indicated generally at 29. Cylinders 1 through N follow with associated disk drive track information 33 and 35 respectively.

Each of the device, cylinder, and track header entries in the table [headers] also include at least a first bit position 31 which if set, indicates that at least one track in the cylinder, and at least one cylinder on the device is stored in cache. Thus, each cache index/directory table forms a "pyramid" or hierarchy of indices beginning with a device entry, followed by a cylinder entry-which in turn is followed by one or more track entries. This "pyramid" or hierarchy allows the present cache manager to search and inquire device-by-device and data storage element by data storage element (track in this example) whether any records or data elements from the storage device are stored in cache.

For example, if the device entry does not include its "in cache" bit as "set", then no further search of the table entries for that device are required. If a given cylinder entry does not have its "in cache" bit set, then the present cache manager knows that no tracks on that cylinder are in cache, and no further inquiry is required to that cylinder.

Also included in each of the track entries is at least a second bit position 37 which is reset once the prefetched track (or record) has been used by the host. The usefulness of this bit will be further described below. Such a device by device cache index/directory is also described in detail in Applicants' U.S. Pat. No. 5,341,493, issued on Aug. 23, 1994, and Applicant's U.S. Pat. No. 5,206,939, issued on Apr. 27, 1993, both of which are incorporated herein by reference.

Also included within at least each track index 29 is a time indicator 39 which preferably indicates in real time, or alternatively relative to some other established time or event, the time at which the was written to cache, last requested by the host, written to a longer term data storage device, retrieved from the data storage device or some other predetermined event or action from which time can be measured.

Further included within at least each cylinder track information index 29 is a counter 41 which is reset to zero when the data element is placed in cache, and incremented, by one, each time a data element in the track is accessed. Using this counter, the cache manager of the cache management system of the present invention can determine the number of times any data has been accessed while in cache by reading the contents or value of the counter. Data elements may include data records, individual data items or entire tracks of a disk drive, for example.

A data storage system incorporating the present cache management system further includes a system manager console 26, FIG. 1. The system manager console 26 allows the user to input 6 the initial default criteria for the cache management system which can later be modified by the cache manager as will be explained below. This allows the user to establish the initial default criteria to begin to optimize the performance of the cache memory by tailoring the cache manager and the cache management system to the particular data storage devices, application programs being executed, or connected host systems.

The cache manager also enables the detection and identification of sequential data streams. The manager 10 receives user supplied input criteria including at least three elements namely: (A) the minimum number of data elements which must be stored in cache memory with a proper time value and actually used by a coupled system such as a host before the cache management system recognizes a sequential data access in progress; (B) the maximum number of tracks or other sized data elements which the cache management system is to prefetch ahead; and (C) the maximum number of sequential data elements to be stored in cache before the memory locations containing the previously used tracks or data elements are reused or recycled and new data written to these location(s).

The three user input criteria required by the cache manager are maintained by the cache manager on each device controller 20 for each data storage device 18 coupled to the controller. Since most processes typically utilize data from only one data storage device, the criteria established for any given data storage device are utilized to control and manage cache for each and every process requesting data from the given data storage device 18.

An example of the above-mentioned initial user input criteria is shown in Table I below for an exemplary device controller I (20a) which controls six disk drives by means of SCSI (Small Computer System Interface) channels 0 through 5.

TABLE I

| Device Controller N | | | | | | |
|---|---|---|---|---|---|---|
| 1. SCSI Drive Number | 0 | 1 | 2 | 3 | 4 | 5 |
| 2. Prefetch (Cache Management) Enable | Y | Y | Y | Y | Y | Y |
| 3. Min Track Seq Threshold | 2 | 2 | 2 | 2 | 2 | 2 |
| 4. Tracks Prefetch Ahead | 2 | 2 | 2 | 2 | 2 | 2 |
| 5. Max Tracks Tail To Cut | 5 | 5 | 5 | 5 | 5 | 5 |

Accordingly, line 2 of the exemplary Table I indicates that prefetching (i.e. cache management) is enabled for all six drives or devices controlled by the device controller. The third line of the Table indicates that each drive has a minimum previously requested physically adjacent track threshold of 2 before a sequential operation is declared.

Figure 3:
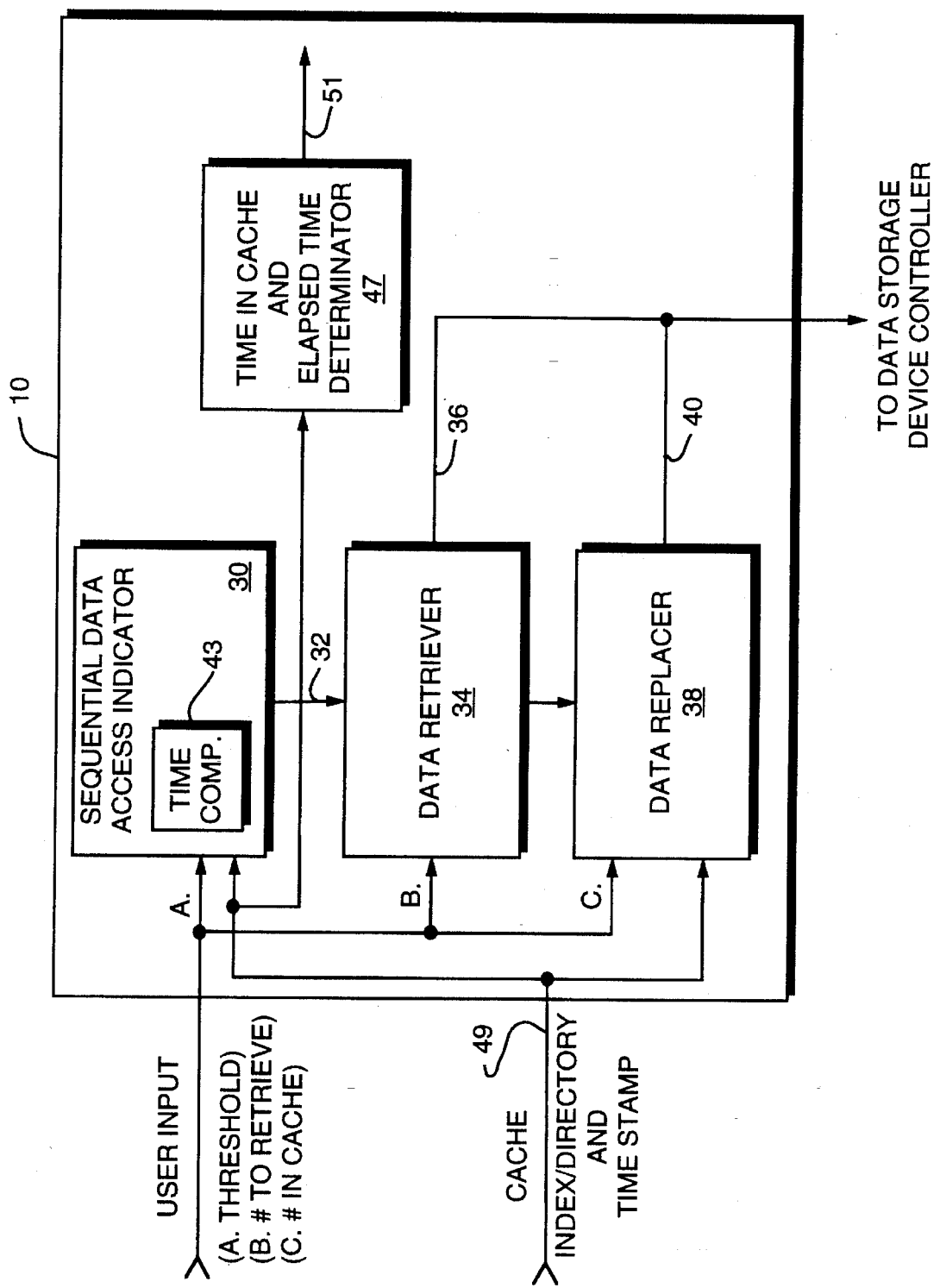
FIG. 3 is a more detailed block diagram of the cache manager of FIG. 1.

The use of such parameters and criteria by the cache manager 10 is shown in greater detail in FIG. 3 wherein the sequential data access indicator 30 utilizes the minimum sequential data element threshold (A), which for this example is 2, and input from the cache contents index/directory 16 including an indication of what data is in cache, as well as a time comparison implemented by the cache manager software in the preferred embodiment, to provide an indication 32 of a sequential data access in progress. Since application programs or "jobs" typically run entirely on one disk drive or other type of longer term data storage device, the data processing manager or user can selectively determine, on a process-by-process basis in a multi-process environment, the threshold criteria to be utilized by establishing the initial default criteria for each data storage device.

In addition to using the minimum sequential track in cache threshold input criteria (A), the cache manager utilizes the time indication (39, FIG. 2) associated with each track in cache and stored in the cache index/directory to provide a determination 32 that a sequential data access is in progress.

Shown below in Table II are representative entries from cache index/directory 16 illustrating physically adjacent tracks of data on a particular disk drive.

TABLE II

| Line | Data Element | In Cache | Time Indication | Sequential Indication |
|---|---|---|---|---|
| 1 | 1 | Yes | 10 | No |
| 2 | 2 | Yes | 11.5 | Yes |
| 3 | 3 | Yes | 12.0 | Yes |
| 4 | N | Yes | 10 | No |
| 5 | N + 1 | Yes | 9 | No |
| 6 | N + 2 | Yes | 13 | No |

As shown in line 1 of this Table, the first data element was placed in cached with a time indication of "10:00". Although this example uses relative time, time is preferred and other timing indications are contemplated. The second entry at line 2 (physically adjacent to the first element) was placed in cache, retrieved from a data storage device, and requested by the host or other relevant event or status at time 11.5. Using the system and method of the present invention, a software implemented time comparator 43 of sequential data access indications 30 compares the two time indications (or more time indicators if the user established minimum previously requested sequential track threshold (A) is greater than two) by subtracting a second time indication (11.5) from a first time indication (10).

If the difference in time indications is less than a preestablished value, an indication signal of sequentiality 32 is issued. Currently, the pre-established value has been empirically determined and is pre-set at two (2) seconds, although other values will undoubtedly prove useful in other situations. Additionally, the present pre-established value is not generally user selectable although user selectability is considered to be within the scope of the present invention.

At line 3 Table 2, a third data element with a time indication of 12.0 is shown. By comparing the time indication of data element 3 with that of data element 2, the present system and method determines that a difference of less than 2 (the preestablished value) exists, and a sequential indication is given.

At line 4, data element N is shown with a time indication of 10. Since the minimum previously requested track threshold has not been met, no sequential indication 32 is issued. At line 5, data element N+1 is indicated as in cache with a time indication of 9. When the time indication of element N+1 (9) and data element N (10) are compared, the cache manager finds the data element out of sequence (a negative number) in a multi-processing operation such as when the second element is used first and thus, although prior systems would have issued a sequential data access indication, the present invention can detect that the two physically adjacent data elements were requested randomly, out of sequence, most likely by two different jobs or processes and thus, no sequential access indication is issued.

At line 6, data element N+2 with a time indication of 13 is found. By comparing the time indication of data element N+2 (13) with the time indication of data element N+1 (9) comparator 29 detects a proper sequence but a difference of greater than the pre-established difference of 2 seconds and therefore, no sequential indication is issued. Although two data elements are compared above for exemplary purposes, any number can be compared based on the user selectable sequential threshold.

The system and method of the present invention can therefore detect, in a multi-processing environment, a sequential data access which is taking place by any process which is utilizing the cache memory which the present cache manager is monitoring.

Upon receiving an indication 32 that a sequential data access is taking place for a given process, data retriever 34 utilizes the second user input criteria (B) that is, the maximum number of tracks to prefetch ahead, to provide a request over line 36 to the appropriate data storage device controller to fetch the next sequential track or other data element for the given process. Since the user knows which processes will be executing on which data storage devices, the initial value of this parameter may be adjusted to maintain a balance between having the proper number of data elements or tracks prefetched versus prefetching too many data elements or tracks. It should be noted that prefetching too many tracks will seriously impact the performance of the data processing system by causing the data storage device controller to spend large amounts of time prefetching data which will not likely be used or will not be used for a long period of time to come and in addition, unused data takes up valuable cache memory space.

Finally, the third parameter (C) is the maximum number of data records to be maintained in cache for this process before the records stored in cache memory for this process are overwritten. Thus, in the present example, Table I indicates that five tracks or data records are maintained in cache before the least recently used (LRU) data element such as a track or data record is replaced or overwritten in the cache in accordance with a least recently used cache management algorithm as is well known in the art.

Accordingly, data replacer 38, which forms part of the cache manager 10, receives the third user input criteria or parameter (C) as well as an indication of cache contents from cache index directory 16 to provide an indication 40 to the data storage device controller to control the reuse or recycling of previously used cache memory locations allocated to the given process, and to reset the in-cache flag or bit associated with the data which is replaced by overwriting.

Figure 4A:
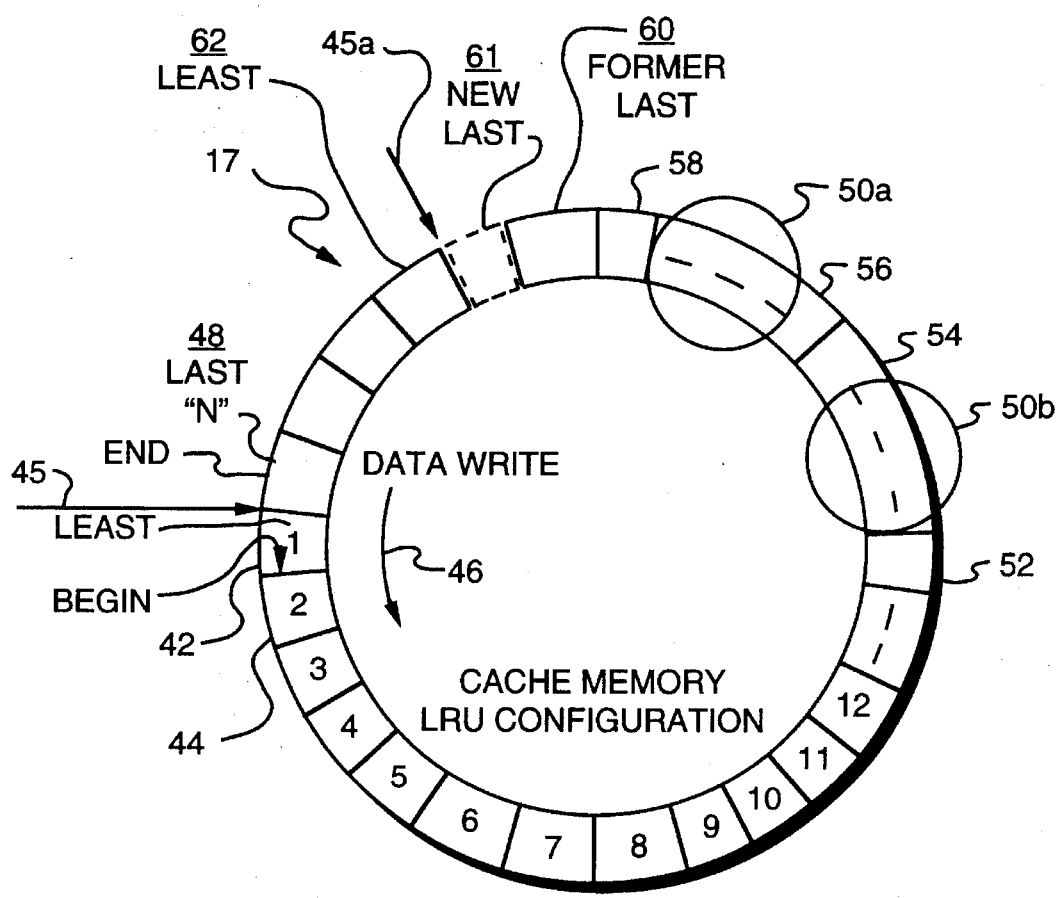
FIGS. 4A–4C illustrate the operation of the present cache manager.
Figure 4B:
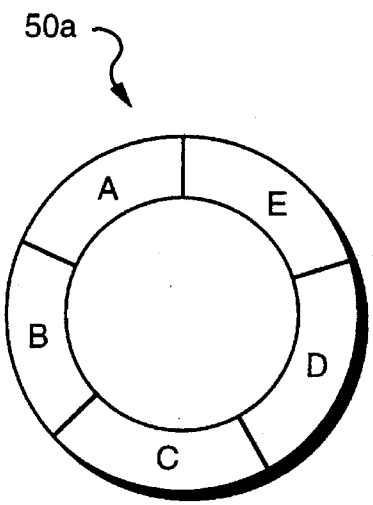
Figure 4C:
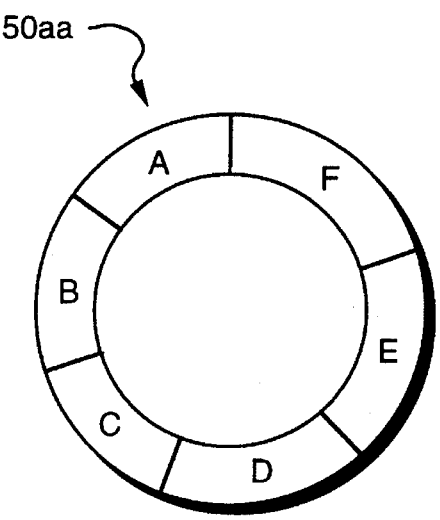

A further illustration useful in describing the present cache manager is shown in conjunction with FIGS. 4A–4C wherein in FIG. 4A, second cache memory Section 17 is shown in a least recently used (LRU) configuration. In such a configuration, which is well known to those skilled in the art, a predetermined number of main memory locations, which number is controllable by the system manager based upon cache usage, is allocated to cache data elements in a "circular" fashion wherein a first (last recently used) data element is written to a logical first or "top" block of memory 42, and a second data record is written to the second logical block of memory 44. Cache memory "pointer" 45 always points to the junction between the last recently used memory location (48, for example) and the least recently used location (42, for example).

Writing to cache memory proceeds around the "circular" cache memory in the direction indicated by arrow 46 by moving or incrementing pointer 45. Once data has been written to the last or "N" memory location 48, the cache management system overwrites or recycles the oldest or least recently used (bottom) memory location 42, and continues to overwrite previously used memory locations in sequence.

It is important to note that the cache memory, such as second section 17, is not fixed in size but rather, expands and contracts with usage. The ability of the cache memory to expand and contract allows additional data elements to be inserted into the cache periodically. For example, according to one feature of the present invention, the cache manager must be able to insert data elements between the cache memory "pointer" 45 and a least or last recently used memory storage location.

As previously described in conjunction with FIG. 3, the cache manager of the present invention includes, in addition to a time comparator 43, a time in cache and elapsed time determinator 47. The time in cache and elapsed time determinator 47 is responsive to the cache index directory time indication 49 in order to determine the amount of time a data element has spent in the first section 15 of cache memory 12, awaiting writing to a longer term data storage device, as well as the elapsed time it takes for a data element to enter and exit the second section 17 of the cache memory (average fall through time). The comparison signal over line 53 from the time in cache and elapsed time determinator 47 indicates whether or not the amount of time the data element has spent in the first cache section 15 is less than, greater than or equal to the elapsed or fall through time for the second cache section.

In response to the determination 51 of the time in cache and elapsed time determinator 47, the cache manager and cache management system of the present invention can then determine where to insert the data element in the appropriate cache memory section. If the time in cache and elapsed time determinator 47 determines that the time a data element has spent in cache is less than the average elapsed time that it takes for a data element to enter and exit second section 17 of the cache memory, as controlled, for example, by an LRU algorithm, than the cache manager will assume that it is possible that the data element will be utilized again, by the host, within a reasonable period of time and will insert the data element into the cache as a "last" recently used data element, on the logical "top" of the memory.

For example, if cache memory "pointer" 45a is currently pointing to the junction between a last recently used memory location 60 and least recently used memory location 62, and the time in cache and elapsed time determinator 47 determines that a given data element has spent less time in cache, awaiting write pending, than the average elapsed time a data element spends in the cache, than the data element 61 will be inserted between the former last recently used data element 60 and the least recently used data element 62 to become the "new" last recently used data element 61, on the "top" of the cache memory. The least recently used algorithm, running in the cache management system, will next overwrite the least recently used data element 62 for a new data element being entered into the cache.

Use of the cache memory in such an LRU configuration proceeds until the present cache manager, utilizing the data storage device cache index/directory tables previously disclosed, determines that one or more processes accessing data on any given device has begun a sequential access. When such an indication is provided as shown previously in FIG. 3, the present cache manager establishes micro-cache memory configurations such as 50*a* and 50*b* shown in FIG. 4A, one such micro-cache for each sequential access in progress. The memory locations for such micro-cache memory configurations are reserved for use by a particular process from the total number of memory locations 42 available to the main cache memory 12.

The present cache manager reserves memory locations from the main LRU by reserving for its own exclusive use, one or more LRU cache memory pointers, one for each cache location, which in essence, prevents the LRU from controlling the cache memory locations pointed to by the pointers and now associated with a particular micro-cache memory configuration. Once the present cache manager determines that a micro-cache memory configuration is no longer necessary for a given particular process, the cache manager will return the memory locations to the main LRU by relinquishing or returning control of the pointers to the main LRU algorithm.

When the cache manager reserves such memory locations for use by one or more specific processes, the LRU algorithm utilized to manage the main cache memory 12 will utilize the memory location shown at 52, and subsequently skip those memory locations 50*b* reserved by the cache manager, and then utilize the next available memory locations 54 and 56, before again skipping the next reserved memory locations 50*a* to utilize the next available memory location 58.

The "size" or number of memory locations allocated to each sequential process is determined by the third criteria or parameter utilized by the cache manager of the present invention namely, the number of blocks to allocate to the process. Thus, as shown in FIG. 4B, micro-cache memory configuration 50*a* includes five memory locations in this example, presuming that the third criteria was set or defaulted to five.

After detecting a sequential data access in progress by a given process and reserving a micro-cache memory configuration for the process, the cache manager begins by prefetching from a data storage device, one-by-one, a number of data records or tracks as indicated by the second user input criteria "B" (i.e., the number of tracks or records to prefetch). Thus, the first prefetched record or track will be stored in memory location "A" within the micro-cache memory configuration 50*a*, while the second prefetched data track or record will be stored at memory location "B". When the host system has requested and read the data at memory location "A", the present cache manager will then prefetch another data record to be stored in memory location "C".

After the host uses the data in memory location "B", the cache manager will prefetch an additional data record and store it in memory location "D". Thus, as is now apparent, with the second user input criteria "B" namely, the number of data elements to prefetch, set at 2, the cache manager of the present invention will continuously keep two prefetched data records ahead of the last record used or read by the host system. Once memory location "E" has been filled with a data record, the cache manager will then overwrite or reuse the first previously used memory location "A". Thus, the process will continue to utilize the micro-cache memory configuration 50*a* reserved for this process.

It is important to note that the present cache manager continues to monitor data use by each and every given process in a multi-purpose environment and when an end of a sequential data access by a process is detected due to non-use, by the host, of a data record stored in cache or the lapse of time which exceeds that set by the sequential access indicator, the cache manager will return all of the reserved memory locations of a given micro-cache memory configuration to the main cache memory. Once a sequential operation has been detected, the cache manager, independent of the main cache management control method (whether it be an LRU control method or otherwise), controls the micro-cache memory for any sequential data access taking place by any given process without interference or intervention from the main cache control method.

An additional feature of the cache manager is the ability of the cache manager to monitor each process for which a micro-cache memory configuration has been reserved, and thus to monitor the effectiveness of the cache management control method controlling each and every sequential process, in an attempt to improve on the method.

Thus, the present cache manager is adapted to dynamically change or alter the user specified or default values of the first and second input criteria namely, the sequential access detection threshold, and the number of data tracks or records to prefetch. The third criteria or parameter namely, the size of the micro-cache memory to establish for each process, is not directly dynamically altered but instead, expands or contracts according to the number of tracks or records to prefetch, as will be explained in greater detail below.

Accordingly, the dynamic monitoring and adjustment feature of the present cache manager continuously monitors the cache index/directory once a sequential process has been detected to determine whether the tracks or data records which have been prefetched in anticipation of use by a given process, have in fact been used as anticipated. Since the cache index/directory includes a flag or bit for each data record which is reset once the data record is read or used, the cache manager can easily detect unused but prefetched data records.

Thus, when the dynamic monitoring and adjustment feature of the present cache manager detects any unused tracks or records which were prefetched, the dynamic monitoring and adjustment feature of the cache manager increases the sequential access detection threshold by one. Therefore, a previously set detection threshold of two would be increased to three. If additional unused prefetched data is again detected, indicating that the process may occasionally use three sequential data tracks or records but then not utilize the fourth or fifth sequential record, than the dynamic monitoring and adjustment feature will again increase the sequential access detection threshold by one to four. Thus, as long as the dynamic monitoring and adjustment feature detects unused tracks, the detection threshold will be increased.

Once the dynamic monitoring and adjustment feature of the present cache manager detects a large number or long continuous string of unused data records or tracks, the detection threshold is decreased by one each cycle of the dynamic monitoring and adjustment feature, until used tracks are again detected, thus causing the dynamic monitoring and adjustment feature to again begin increasing the sequential detection threshold. Accordingly, the sequential detection threshold "floats" at the optimum level for any given process. The dynamic monitoring and adjustment feature of the present cache manager is activated or invoked by the present cache manager based upon a threshold of the number of tracks per device which have been prefetched. For example, one implementation of the present invention contemplates invoking the dynamic monitoring and adjustment feature after fifty tracks per device have been prefetched.

The dynamic monitoring and adjustment feature of the present cache manager also monitors and dynamically adjusts the second criteria or parameter namely, the number of data tracks or records to be prefetched. Adjustment of the number of records to prefetch criteria is a function of the formula:

$$Y = \log_2 X$$

wherein

Y=the number of data tracks or records to prefetch and

X=the number of previously used sequential tracks or data records.

Thus, as shown in Table III below, an initial default value of 2 data tracks or records to prefetch is not increased until 8 sequential data tracks or records have been prefetched and used. The upper boundary for the number of data tracks or records to prefetch is generally considered to be in the range of ten data tracks or records.

TABLE III

| Records Used | Records to Prefetch |
| --- | --- |
| 4 | 2 |
| 8 | 3 |
| 16 | 4 |
| 32 | 5 |
| 64 | 6 |
| 128 | 7 |
| 256 | 8 |
| 512 | 9 |
| 1,024 | 10 |

A result of increasing the number of data tracks or records to prefetch is that the dynamic monitoring and adjustment feature of the cache manager of the present invention will allow the size of the micro-cache memory configuration for a given process to fluctuate in size with a corresponding fluctuation in number of data tracks or records to prefetch. Thus, as shown by micro-cache memory configuration 50aa, FIG. 4C, when the process which was previously utilizing micro-cache memory configuration 50a, FIG. 4B has its number of data tracks or records to prefetch criteria increased by one, one additional memory location "F" is added to the "loop" to allow for this increased in number of data records. Thus, although the third criteria is not altered, the size of the micro-cache memory configuration servicing any given process is allowed to increase with a corresponding increase in number of data or tracks to prefetch, and to decrease, down to the minimum initial default number specified for the device, with subsequent decreases in number of data tracks or records to prefetch.

The present invention features a method for utilizing the amount of time the data element has spent in cache and the number of times the data element has been accessed in order to determine in what position to place the data element in the second section of cache memory, awaiting removal or replacement.

Figure 5:
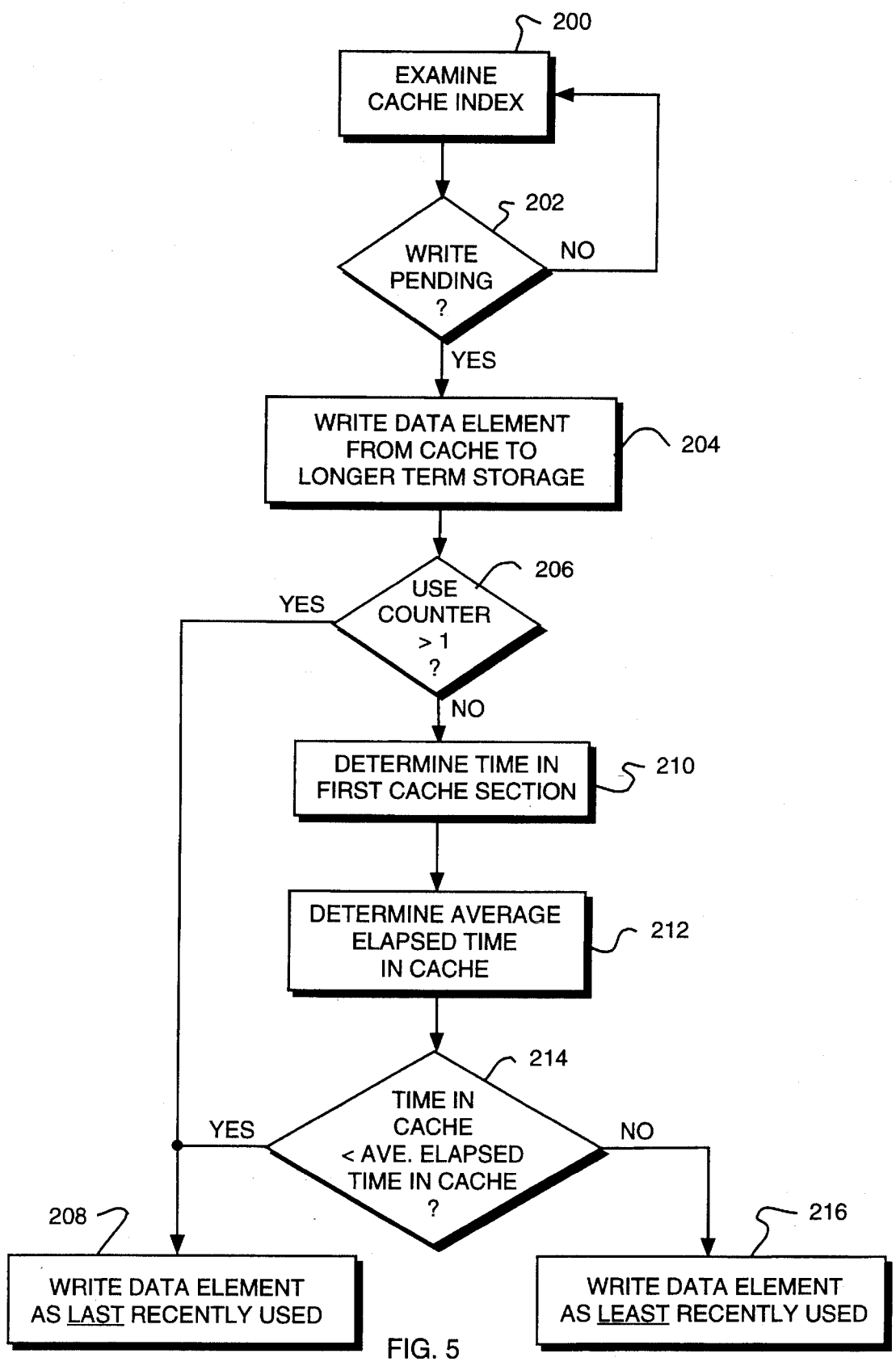
FIG. 5 is a flowchart illustrating the method of determining where to insert a data element in cache in accordance with one aspect of the present invention.

The method for controlling the contents of cache memory first begins by examining the cache index 16 to determine if any data elements must be written to a longer term data storage device 18, step 202, FIG. 5. If there are no write pending data elements, as determined by the write pending host 31 in the index 16, the cache manager 10 of the present invention continues to examine the next cache index 16 for the next device. If there are data elements, identified by the cache index, that require writing to a longer term data storage device, the method of the present invention next causes the data element to be written from cache 12 to a longer term data storage device 18, step 204 as is well known in the art.

After the data element is copied from cache to the longer term data storage device, the cache manger 10 of the present invention examines the use or access counter 41, step 206, to determine how many times the data element has been accessed while waiting to be written to longer term data storage. If the examination of the use or access counter indicates that the data element was used more than once while stored in cache and awaiting writing to a longer term data storage device, the cache manager 10 of the present invention writes the data elements into cache memory 12 as the last recently used data element without regard or without determination as to how long the data element has been in cache.

The reason for not looking at the elapsed time in cache in such a situation is that since the data element has been used more than once while in cache, it is likely that the data element will be used again and it should be stored in the top most position of the second segment 17 of the cache 12 so as to be sure that it will remain in the cache as long as possible, thus allowing a host or process requiring access to the data as much opportunity as possible to access the data while it is still in cache, before the data must be read from a longer term data storage medium.

If, at step 206, it is determined that the usage or access counter of the data element is not greater than one, the cache manager 10 next determines the amount of time the data element has spent in the first section 15 of the cache 12, awaiting writing to disk, at step 210. At step 212, the cache manager 10 next determines the average elapsed time that a data element spends in the second section 17 of the cache memory 12. Using the elapsed time that it takes for a data element to be inserted into the top of the cache and be discarded or removed by the least recently used algorithm ensures that the system and method of the present invention allows as much time as possible for a data element to remain in cache.

In the preferred embodiment of the present invention, it is contemplated that the determined average elapsed time will be further multiplied by two and a comparison made with the multiplied number versus the amount of time a data element has spent in cache in order to be certain that data, which should remain in cache, is not removed prematurely.

At step 214, the cache manager 10 of the present invention next compares the amount of time a data element has spent in cache with the average (or two times average) elapsed time a data element in cache. If the actual time a data element has spent in cache is less than the average elapsed time, or less than some other formula using the average elapsed time, than the data element is written as the last recently used data element in the cache, step 208. If, however, the amount of time a data element has actually spent in cache is already greater than the average elapsed time that a data element spent in cache, chances are that the data element will not be used again within a reasonable period of time and accordingly, it is written as a least recently used data element, step 216, to be shortly removed or written over by the least recently used algorithm.

Figure 6:
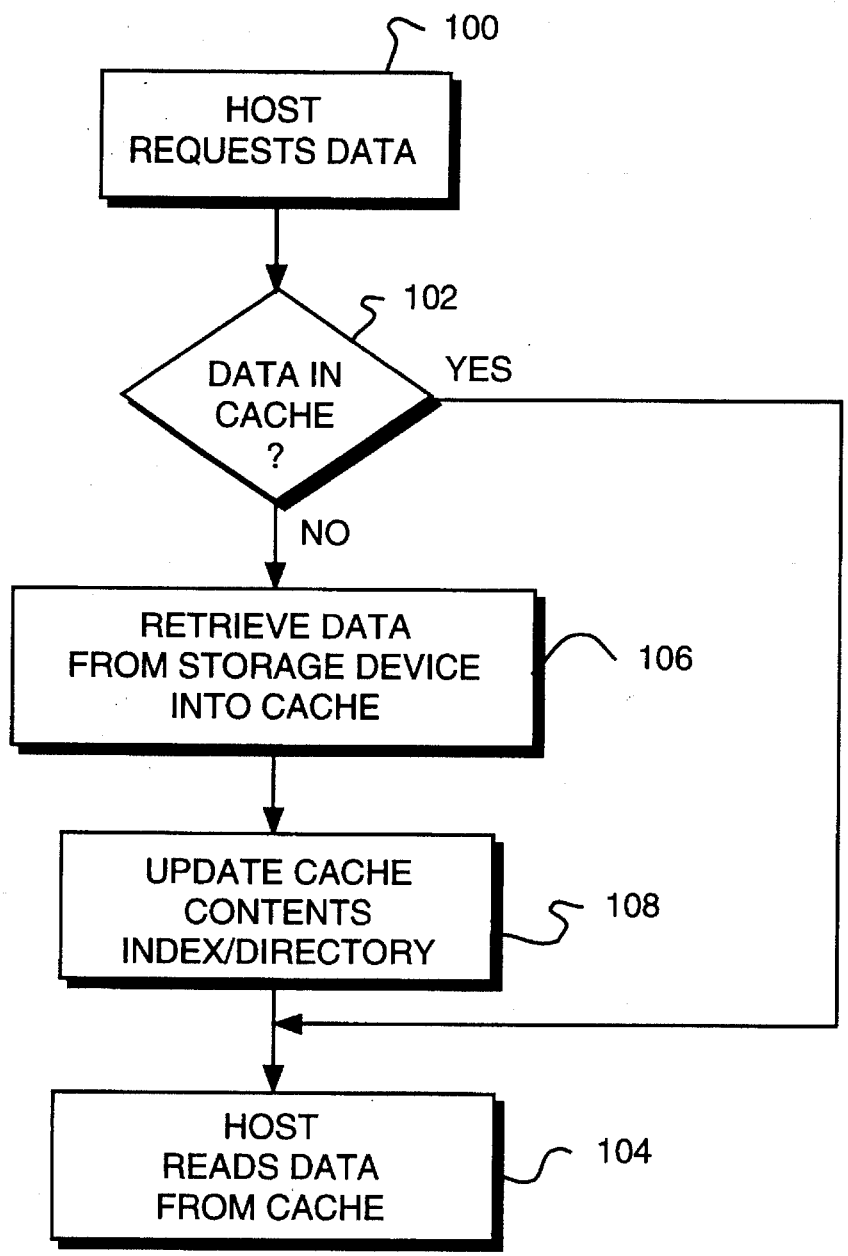
FIG. 6 is a flowchart illustrating data access by a host coupled to a data processing system incorporating the present cache management system and method.

A further method for monitoring and controlling the contents of cache memory 12 utilizing the cache manager 16 is also disclosed. The method includes requesting data by at least one host 22 coupled to the data storage system step 100, FIG. 6 followed by determination by the host adapter 24 of whether the requested data is in cache 12, step 102. If the requested data is in cache memory 12, the host reads the data from cache, step 104.

If, at step 102, a determination is made that the data is not in cache, the host controller 24 instructs a device controller 18 to retrieve the requested data from a coupled data storage device 18. The retrieved data is stored in cache memory 12, step 106 and the cache contents index directory 16 is updated, step 108.

Figure 7:
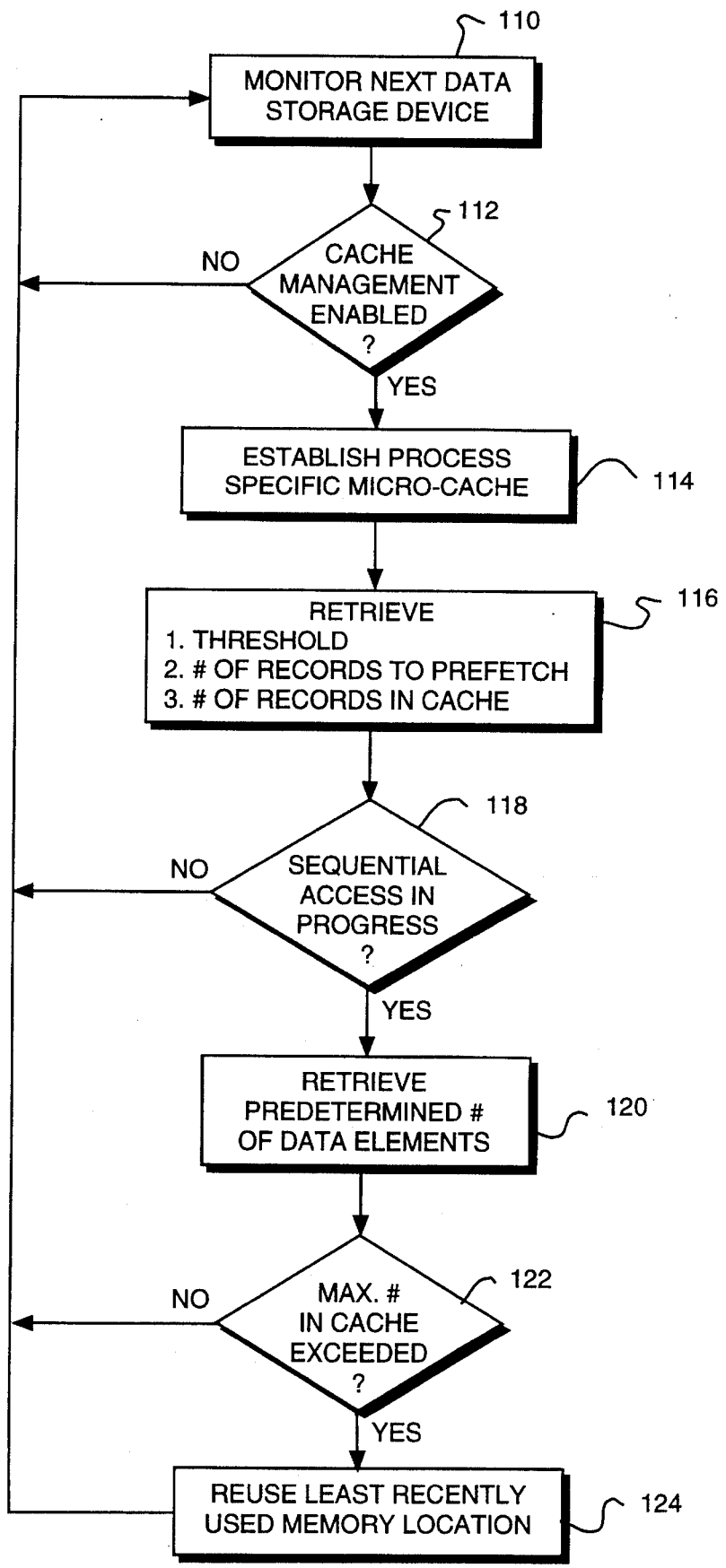
FIG. 7 is a flowchart illustrating the operation of the present cache management system.

Continuously and generally concurrently with the host requesting data from one or more data storage devices, the present cache manager inquires of a first data storage device 18, step 110, FIG. 7, and verifies that cache management has been enabled for the particular data storage device, step 112. One or more process specific micro-caches are established for this device, step 114. Three parameters are next retrieved by the cache manager, namely (1) the sequential access threshold; (2) the maximum number of data elements to be prefetched; and (3) the maximum number of sequential data elements to be maintained in cache for this particular process, step 116.

After the in cache 31 and used flags 37 of the cache index/directory 16 for the given data storage device 18 being monitored are scanned, and utilizing the time stamp or indication stored in the cache index/directory 16, the sequential data access indicator 30 determines whether or not a sequential data access is in progress, step 118. If a sequential data access is not in progress by any given process running on the storage device being presently monitored, another data storage device is monitored.

If, at step 118, the sequential data access indicator indicates that a sequential data access is in progress by at least one process accessing the data storage device, the method utilizing the cache manager of the present invention proceeds to step 120 to retrieve, one data element or track at a time, up to the predetermined maximum number of data elements or tracks to be prefetched as established by the second criteria.

Figure 8:
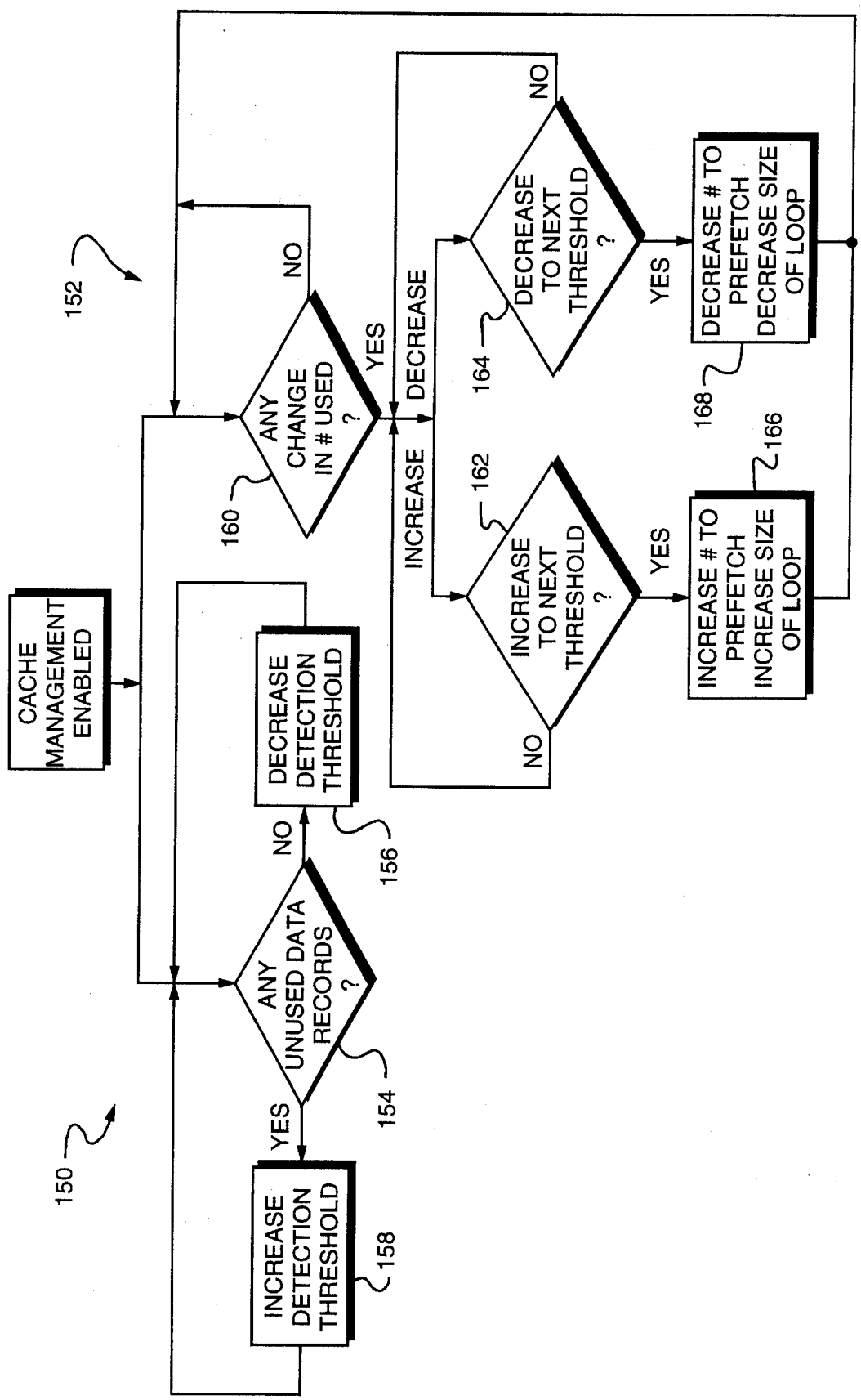
FIG. 8 is a flowchart illustrating the operation of the dynamic monitoring and adjustment feature of the present cache manager.

A further feature of the present invention is the dynamic monitoring and adjustment feature of the cache manager 10 of the present invention as previously described. FIG. 8 is a flowchart which illustrates the two parallel and generally simultaneous dynamic monitoring and adjustment procedures 150, 152 undertaken by this feature of the present invention if the cache manager 10 is enabled for at least one data storage device coupled to the system.

As shown in the dynamic monitoring and adjustment procedure 150, the method of dynamically monitoring and adjusting the cache management parameters includes sequentially monitoring the cache index/directory 16 data used flags 37 for each data storage device to detect any unused data tracks or records, step 154. If no data used flags 37 are detected, the dynamic monitoring and adjustment procedure decreases the sequential access detection threshold (the first parameter A), step 156, and returns the program to monitor for any used data flags 37 records for the next data storage device. If, however, the program detects any unused data tracks or records at step 154, the procedure continues to step 158 wherein the sequential access detection threshold (the first parameter A) is increased by one, with the procedure returning to monitor the current device cache index/directory 16 for any additional unused data tracks or records.

Generally simultaneously with and in parallel with the monitoring procedure described above, the dynamic monitoring and adjustment feature of the cache manager 16 also executes the procedure indicated generally by 152 which includes monitoring the cache index/directory 16 for any change in the total number of used sequential data tracks or records which were prefetched by any given process executing on the device, step 160. If no change in the total number of used records or tracks is detected, no adjustments to the cache manager criteria are made.

If, however, a change in the total number of tracks or records is detected at step 160, the dynamic monitoring and adjustment feature of the present cache manager 10 proceeds to either step 162 in the case of an increase in the total number of data tracks or records used, or to step 164 in the case of a decrease in the total number of data tracks or records used.

In the case of an increase in the total number of data tracks or records used, the dynamic monitoring and adjustment feature of the present cache manager 10 determines at step 162 if the increase in the total number of data tracks or records used has reached the next threshold as previously described in conjunction with Table I. If the increase has reached the next threshold, processing continues to step 166, wherein the second criteria of the cache manager namely, the number of data tracks or records to prefetch is increased by one. In addition, the third criteria (C) namely, the number of data records or tracks to maintain in the micro-cache "loop" for the given process is also increased by one with processing returning to step 160 to detect any change in the total number of data tracks or records used.

If a decrease in the total number of data tracks or records used is detected at step 160, the dynamic monitoring and adjustment feature of the present cache manager 10 determines at step 164 if the total number of data tracks or records has decreased to the next threshold and if so, processing continues to step 168 wherein the number of data tracks or records to prefetch (the second criteria B) of the cache manager is decreased by one.

Also at this step in the procedure, the actual number of memory locations in the processes micro-cache memory "loop" will also be decreased by one if it currently exceeds the predetermined number of memory locations established by the user as the third criteria or parameter. Subsequently, processing returns to step 160 to monitor and detect any change in total number of unused data tracks or records.

Accordingly, the system and method of the present invention provide a reliable, accurate and low overhead cache management system including a sequential access indicator which is based not only on merely the number of data elements or tracks which are requested by a given host or process but more importantly, on the relative time between a given event or status of two physically adjacent data elements or tracks stored in cache memory.

Modifications and substitutions by one of ordinary skill in the art are considered to be within the scope of the present invention which is not to be limited except by the claims which follow. For example, hardware elements may be substituted for software elements as well known in the art. In addition, this invention can be practiced on any electronic data processing system utilizing shorter term memory commonly called "cache memory" and preferably including longer term data storage such as a disk driven, tape drive, optical disk, etc.

What is claimed is:

1. A cache management system including a cache manager, for monitoring and controlling contents of a cache memory coupled to at least one longer term data storage device, said cache management system comprising:

said cache memory including a first cache memory section, for storing data elements awaiting writing to said at least one longer term data storage device, and a second cache memory section for storing data elements which have been written to said at least one longer term data storage device, said data elements stored in said second cache memory section including a last recently used data element and a least recently used data element, said last recently used data element moveable, over time, in said second cache memory section to become said least recently used data element;

a time indicator, for providing a time indication signal;

a cache indexer, responsive to said time indication signal, for maintaining a cache index of data elements which are stored in at least said first and second cache memory sections, said cache index of data elements including a time indication associated with each data element indexed in said cache index by said cache indexer; and a cache manager for placing data elements into and removing data elements from said first and second cache memory sections, said cache manager responsive to at least one data element stored in said first cache memory section and written to said at least one longer term data storage device, and responsive to said time indication associated with each data element stored in said cache and indexed in said cache index by said cache indexer, for determining an average period of time that elapses between at least one data element being inserted into said second cache memory section as a last recently used data element, and said at least one data element inserted into said second cache memory section as a last recently used data element being removed from said second cache memory section as said least recently used data element, and for determining a period of time that said at least one data element was stored in said first cache memory section, for comparing said average period of time that elapses with said period of time said at least one data element was stored in said second cache memory section, for placing said at least one data element into said second cache memory section as a last recently used data element if said period of time is less than said average period of time that elapses, and for placing said at least one data element into said second cache memory section as a least recently used data element if said period of time is greater than said average period of time that elapses.

2. The cache management system of claim 1, wherein said at least one longer term data storage device includes at least one disk drive.

3. The cache management system of claim 2, wherein said data elements include disk drive tracks.

4. The cache management system of claim 1, wherein said cache manager determines, for a plurality of data elements, an average period of time that elapses between a data element being inserted in said second cache memory section as a last recently used data element and said data element being removed from said second cache memory section as said least recently used data element.

5. The cache management system of claim 1, wherein said system includes a plurality of coupled longer term data storage devices; and wherein said cache indexer maintains only one cache index.

6. The cache management system of claim 1, wherein said cache manager determines if said average period of time is greater than or less than two times said average period of time that elapses.

7. The cache management system of claim 1, wherein said cache index includes a data element access counter, for providing an indication of a number of times each data element stored in said first cache memory section has been read; and wherein if said cache manager determines a number of times a data element has been read while stored in said first cache memory section and, if said number of times said data element has been read is greater than one, said cache manager places said at least one data element into said second cache memory section as a said last recently used data element without comparison of said average period of time that elapses with said period of time said data element was stored in said first cache memory section.

8. The cache management system of claim 1, wherein said cache indexer maintains a cache index indicating data elements which are retrieved from said at least one longer term data storage device and stored in said cache memory.

9. The cache management system of claim 8, wherein said time indication associated with each element indexed in said cache index includes a time of retrieval of an associated data element from said at least one longer term data storage device.

10. The cache management system of claim 1 further including:

a sequential data access indicator, responsive to said cache index, for detecting at least first and second sequential data elements stored in said cache memory, and responsive to said detection of a plurality of sequential data elements stored in said cache memory, to a user selectable sequential data access indicator threshold value, and to a comparison of said time indications associated with at least said first and second sequential data elements, for providing an indication that at least one process executing on at least one host coupled to said at least one longer term data storage device is effecting a sequential data access.

11. The cache management system of claim 10, further including:

a data retrieval requestor, responsive to said indication that at least one process executing on at least one host coupled to said at least one longer term data storage device is effecting a sequential data access, and responsive to a user selectable value of a predetermined number of data elements to be prefetched, for requesting retrieval from said at least one longer term data storage device of up to a number of data elements equal to the value of said user selectable predetermined number of data elements to be prefetched; and a cache data replacer, responsive to a user selectable value of a predetermined maximum number of sequential data elements to be stored in said second section of cache memory for use by said at least one process effecting a sequential data access, and to said data retrieval requestor requesting retrieval of a data element, for requesting replacement of at least one least recently used sequential data element stored in said second section of said cache memory.

12. The cache management system of claim 10, wherein said sequential data access indicator provides an indication of the termination of a sequential data access in effect by said at least one process upon detection of non-sequential data elements requested by said at least one process and stored in said cache memory.

13. The cache management system of claim 12, wherein said one cache index is organized on a longer term data storage device by longer term data storage device basis.

14. The cache management system of claim 11, wherein said selectable sequential data access indicator threshold value and the value of said selectable predetermined number of data elements to be prefetched are user selectable for each longer term data storage device coupled to the cache management system.

15. The cache management system of claim 1, wherein said cache indexer maintains a cache index for each longer term data storage device coupled to said cache management system.

16. The cache management system of claim 1, wherein each of said data elements retrieved from said at least one longer term data storage device include an individual data record.

17. The cache management system of claim 1, wherein each of said data elements retrieved from said at least one longer term data storage device include all data records stored in one data storage unit of said data storage device; and
wherein said cache indexer maintains a current index of a plurality of data storage units stored in said cache memory.

18. The cache management system of claim 17, wherein said at least one longer term data storage device includes at least one disk drive.

19. The cache management system of claim 18, wherein said data storage unit of said data storage device includes a disk drive track.

20. The cache management system of claim 18, wherein said data storage unit of said data storage device includes a disk drive cylinder.

21. The cache management system of claim 1, wherein said at least one data storage device includes at least one optical disk.

22. The cache management system of claim 1, wherein said cache memory includes a high-speed semiconductor memory.

23. The cache management system of claim 1, wherein said cache management system further includes at least one data storage device controller including said cache manager.

24. The cache management system of claim 1, wherein said cache management system further includes at least one host adapter including said cache manager.

25. The cache management system of claim 11, wherein said cache management system includes one system wide cache memory; and
wherein said cache management system establishes and maintains at least one micro-second cache memory section having a predetermined number of memory locations for use by said at least one process effecting a sequential data access, and said predetermined number of memory locations corresponding to said user selectable value of a predetermined maximum number of sequential data elements to be stored in said cache memory.

26. The cache management system of claim 25, wherein said data retrieval requestor requests storage of said prefetched data elements in said at least one micro second-cache-memory section; and
wherein said cache data replacer requests replacement of the least recently used sequential data element stored in said at least one micro second-cache-memory section.

27. The cache management system of claim 25, wherein said cache management system includes a plurality of processes effecting a sequential data access; and
wherein said cache management system establishes and maintains one micro second-cache-memory section for each of said plurality of processes effecting a sequential data access.

28. The cache management system of claim 25, wherein said at least one micro second-cache-memory section is established and maintained for exclusive use by only said at least one process during the effecting of a sequential data access.

29. The cache management system of claim 28, wherein said cache management system returns the predetermined number of memory locations of said at least one micro second-cache-memory section to, and for use by, said system wide cache memory upon an indication of the termination of a sequential data access in effect by said at least one process, said indication of the termination of a sequential data access provided by said sequential data access indicator upon detection of non-sequential data elements requested by said at least one process.

30. The cache management system of claim 1, wherein said time indication includes a real time indication.

31. The system of claim 1, wherein said time indication includes a relative time indication.

32. A cache management system including a cache manager, for monitoring and controlling contents of a cache memory coupled to at least one longer term data storage device, said cache management system comprising:
said cache memory including a first cache memory section, for storing data elements awaiting writing to said at least one longer term data storage device, and a second cache memory section for storing data elements which have been written to said at least one longer term data storage device, said data elements stored in said second cache memory section including a last recently used data element and a least recently used data element, said last recently used data element moveable, over time, in said second cache memory section to become said least recently used data element;
a time indicator, for providing a time indication signal;
a cache indexer, responsive to said time indication signal, for maintaining a cache index of data elements which are stored in at least said first and second cache memory sections, said cache index of data elements including a time indication associated with each data element indexed in said cache index by said cache indexer, said cache index including a data element access counter providing an indication of a number of times said data element has been read while stored in said first cache memory section;
a sequential data access indicator, responsive to said cache index, for detecting a plurality of sequential data elements stored in said cache memory, and responsive to said detection of a plurality of sequential data elements stored in cache memory, to a user selectable sequential data access indicator threshold value, and to a comparison of said time indications associated with at least first and second sequential data elements of said plurality of detected sequential data elements, for providing an indication that at least one process executing on said at least one host is effecting a sequential data access; and
said cache manager for placing data elements into and removing data elements from said first and second cache memory sections, said cache manager responsive to at least one data element stored in said first cache memory section and written to said at least one longer term data storage device, and responsive to said indication of said number of times said data element has been read while stored in said first memory section included in said cache index, for determining a number of times the data element has been accessed while stored in said first cache memory section, and if said number of times said data element has been accessed is greater than one, for placing said at least one data element into said second cache memory section as a least recently used element.

33. A cache management method, for monitoring and controlling contents of a cache memory coupled to at least one host and to at least one data storage device, said cache management method comprising:

providing said cache memory including a first cache memory section, for storing data elements awaiting writing to said at least one longer term data storage device, and a second cache memory section for storing data elements which have been written to said at least one longer term data storage device, said data elements stored in said second cache memory section including a last recently used data element and a least recently used data element, said last recently used data element moveable, over time, in said second cache memory section to become said least recently used data element;

providing a time indicator, for providing a time indication signal;

providing a cache indexer, responsive to said time indication signal, for maintaining a cache index of data elements which are stored in at least said first and second cache memory sections, said cache index of data elements including a time indication associated with each data element indexed in said cache index by said cache indexer;

providing a cache manager, responsive to said time indication associated with each data element stored in said cache and indexed in said cache index by said cache indexer, said cache manager determining an average period of time that elapses between at least one data element being inserted into said second cache memory section as a last recently used data element, and said at least one data element inserted into said second cache memory section as a last recently used data element being removed from said second cache memory section as said least recently used data element;

determining a period of time that said at least one data element was stored in said first cache memory section;

comparing said average period of time that elapses with said period of time said at least one data element was stored in said first cache memory section;

placing said at least one data element into said second cache memory section as a last recently used data element if said period of time is less than said average period of time that elapses; and placing said at least one data element into said second cache memory section as a least recently used data element if said period of time is greater than said average period of time that elapses.

* * * * *